United States Patent [19]

Saurenman

[11] Patent Number: 4,626,917
[45] Date of Patent: * Dec. 2, 1986

[54] STATIC NEUTRALIZATION EMPLOYING NON-CORRODING ION DISPENSING TIPS

[75] Inventor: Donald G. Saurenman, Whittier, Calif.

[73] Assignee: Consan Pacific Incorporated, Whittier, Calif.

[*] Notice: The portion of the term of this patent subsequent to Jun. 28, 2000 has been disclaimed.

[21] Appl. No.: 680,143

[22] Filed: Dec. 10, 1984

Related U.S. Application Data

[63] Continuation-in-part of Ser. No. 570,926, Jan. 16, 1984, Pat. No. 4,498,116, which is a continuation-in-part of Ser. No. 420,904, Sep. 21, 1982, Pat. No. 4,502,093, which is a continuation-in-part of Ser. No. 369,925, Apr. 19, 1982, Pat. No. 4,484,249, which is a continuation-in-part of Ser. No. 290,423, Aug. 6, 1981, Pat. No. 4,390,923, which is a continuation-in-part of Ser. No. 259,503, May 1, 1981, Pat. No. 4,388,667, which is a continuation-in-part of Ser. No. 241,684, Mar. 9, 1981, Pat. No. 4,493,289, which is a continuation-in-part of Ser. No. 124,242, Feb. 25, 1980, Pat. No. 4,282,830.

[51] Int. Cl.$^4$ ............................................. H05F 3/00
[52] U.S. Cl. ..................................... 361/216; 361/222
[58] Field of Search ............... 174/175; 361/212, 215, 361/216, 231, 232, 222

[56] References Cited

U.S. PATENT DOCUMENTS 1,480,573 3/1919 Smith .
2,043,217 6/1935 Yaglon .
2,231,324 2/1941 Cromfton, Jr. .
2,264,495 12/1941 Wilner ............................ 361/231 X
2,565,454 8/1951 MacKenzie et al. .
2,585,799 2/1952 Lawrence .
2,641,804 6/1953 Klein .
2,765,975 10/1956 Lindenblad .
2,844,478 7/1958 Hanley et al. .
3,106,884 10/1963 Dave et al. .
3,203,809 8/1965 Visness et al. .
3,288,054 11/1966 Weprin et al. .
3,308,344 3/1967 Smith et al. ........................... 361/229
3,311,108 3/1957 Cristofv et al. .
3,324,515 6/1957 West .
3,358,289 12/1957 Lee .
3,396,703 8/1968 Trussell .
3,483,672 12/1969 Jahnke .
3,696,791 10/1972 Saurenman .
3,746,924 7/1973 Testone ................................ 361/230
3,757,491 9/1973 Gourdine ........................ 361/226 X
3,818,269 6/1974 Stark ..................................... 361/231
3,870,946 3/1975 Sandorf .
3,976,916 8/1976 Saurenman .......................... 361/213
4,072,762 2/1978 Rhodes .
4,208,438 6/1980 Saurenman .
4,250,804 2/1981 Saurenman .
4,282,830 8/1981 Saurenman .
4,319,302 3/1982 Moulden ............................ 361/213
4,326,454 4/1982 Saurenman ..................... 361/225 X
4,333,123 6/1982 Moulden ............................ 361/213
4,390,923 6/1983 Saurenman .......................... 361/222

FOREIGN PATENT DOCUMENTS 1028351 5/1966 United Kingdom .

Primary Examiner—Michael L. Gellner
Assistant Examiner—Douglas S. Lee
Attorney, Agent, or Firm—William W. Haefliger

[57] ABSTRACT

Apparatus for reducing static electricity comprises:
 (a) electrically conductive cable means having tips spaced therealong to dispense ions in response to voltage application to the cable means,
 (b) the cable means defining cable extents each of which is flexible and includes elongated metallic core extent to which voltage is applicable, protective sleeve extent on and extending about the core extent, the sleeve defining a wall,
 (c) and needles having shanks extending through said wall extents and extending adjacent the core extents to make sideward electrical contact therewith so as to receive voltage application, the needles defining the tips openly exposed outwardly of the cable extents to dispense ions into the atmosphere near the cable means,
 (d) at least certain of the needles having surfaces at said tips consisting of tungsten or tungsten alloy for dispensing positive ions without corroding.

20 Claims, 14 Drawing Figures

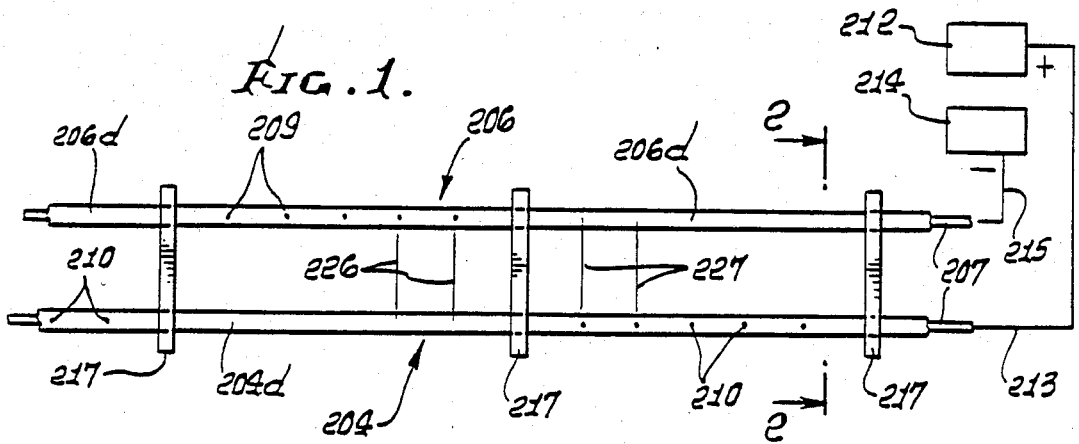
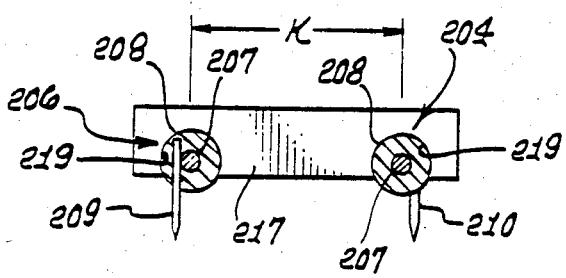
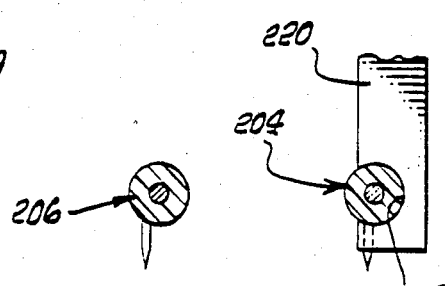
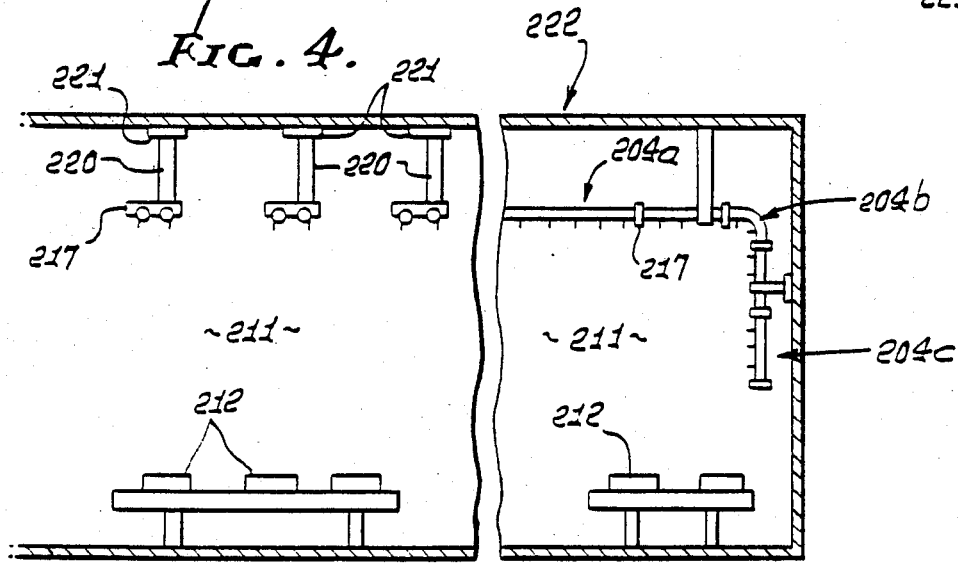

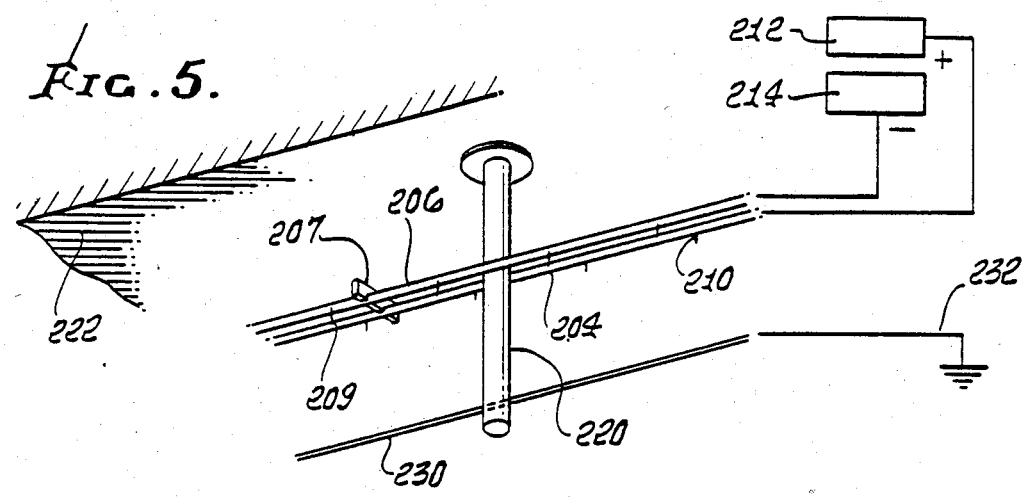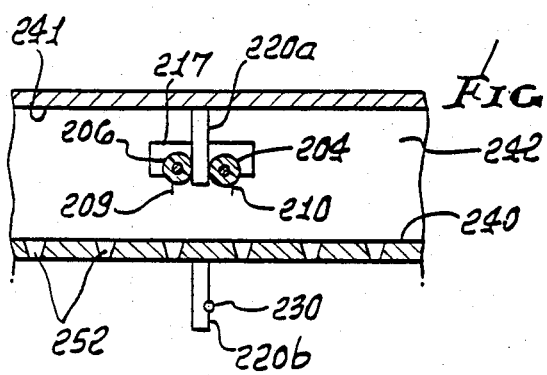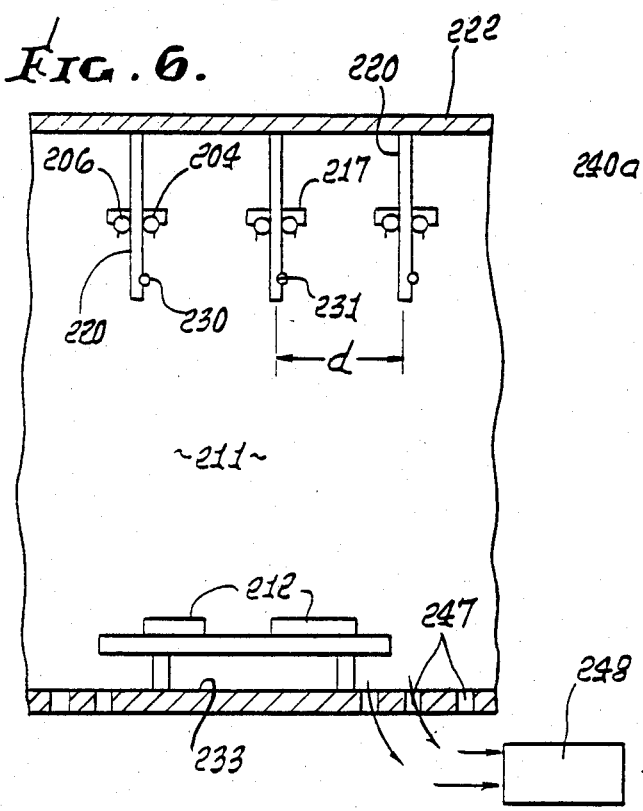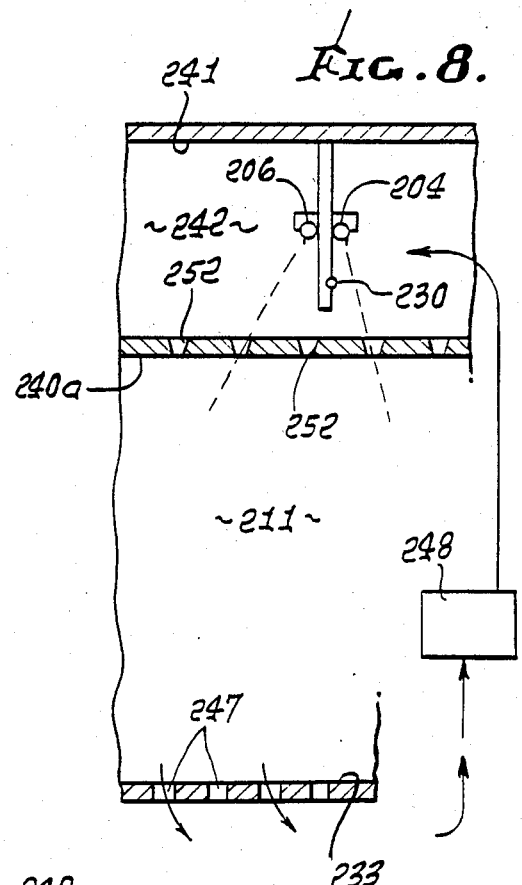

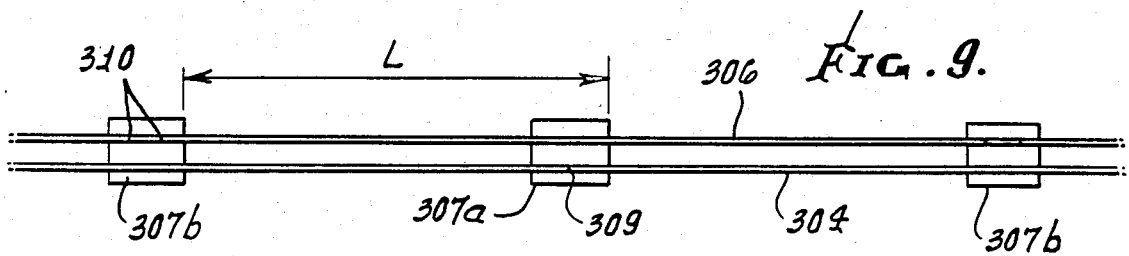
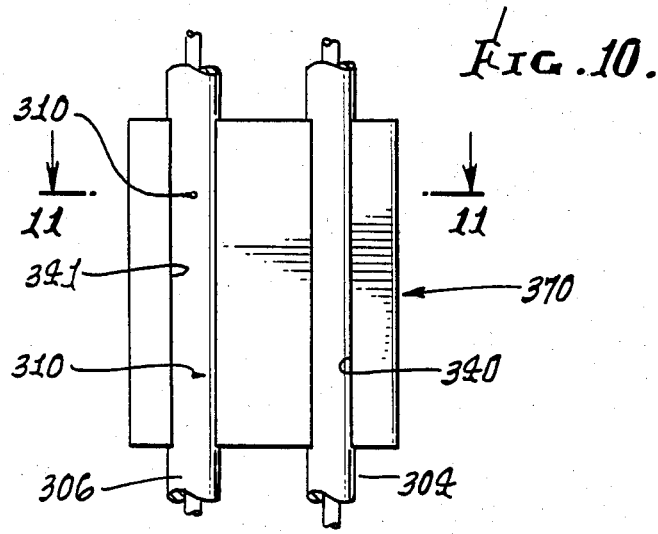
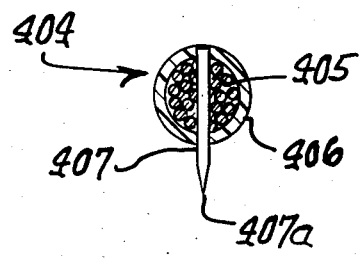
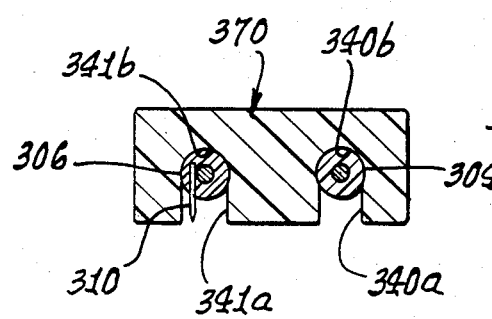
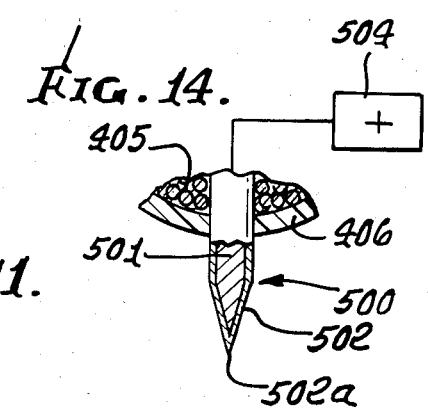
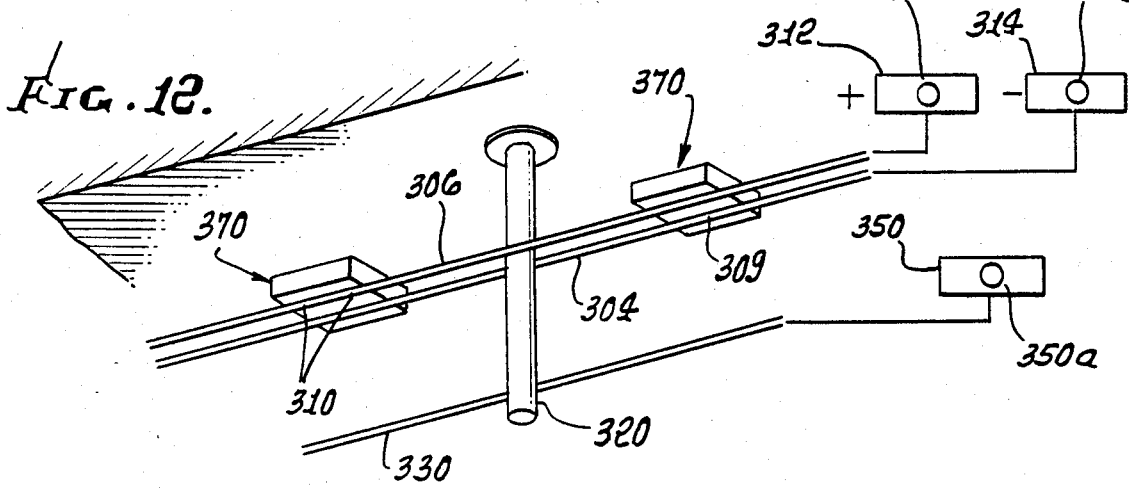

STATIC NEUTRALIZATION EMPLOYING NON-CORRODING ION DISPENSING TIPS

This application is a continuation-in-part of Ser. No. 570,926, filed Jan. 16, 1984, now U.S. Pat. No. 4,498,116, which is a continuation-in-part of Ser. No. 420,904, now U.S. Pat. No. 4,502,093, filed Sept. 1, 1982 which is a continuation-in-part of Ser. No. 369,925, now U.S. Pat. No. 4,484,249 filed Apr. 19, 1982, which is a continuation-in-part of Ser. No. 290,423, now U.S. Pat. No. 4,390,923, filed Aug. 6, 1981, which is a continuation-in-part 259,503, now U.S. Pat. No. 4,388,667, filed May 1, 1981, which is a continuation-in-part of Ser. No. 241,684, now U.S. Pat. No. 4,493,289, filed Mar. 9, 1981, which is a continuation-in-part of Ser. No. 124,242, now U.S. Pat. No. 4,282,830, filed Feb. 25, 1980.

This invention relates generally to the provision of cable means with corrosion resistant ion dispensing needles, located in zones for treatement of work such as plastic articles, animals and edibles, and electronics parts.

There is a need for low cost, efficient means to induce collection of air-borne particles, and to suppress static build-up in certain article treating zones (electric parts procution, plastic parts or material production, paper rolling apparatus, surgical operating rooms, clean room assemblies, and circuit board fabrication, etc.). Prior ion dispensing devices were not easily installable to conform to special requirements as to product shape, zone size, etc., and often did not achieve desired static neutralization contrary to expectations, also, ion dispensing needles which are positively charged tend to corrode, undesirably.

SUMMARY OF THE INVENTION

It is a major object of the invention to provide method and apparatus to achieve controlled neutralization or reduction of static charge on or associated work, or to achieve controlled net positive or negative ion flux in areas at or adjacent to work, and without detrimental needle corrosion.

The apparatus in accordance with the invention basically comprises:

(a) electrically conductive cable means having tips spaced therealong to dispense ion in response to voltage application to the cable means, (b) the cable means defining cable extents each of which is flexible and includes elongated metallic core extent to which voltage is applicable, and protective sleeve extent on and extending about the core extent, the sleeve defining a wall, extents, (c) and needles having shanks extending through said wall extents and extending adjacent the core extents to make sideward electrical contact therewith so as to receive voltage application, the needles defining the tips openly exposed outwardly of the cable extents to dispense ions into the atmosphere near the cable means, (d) at least certain of the needles having surfaces at said tips consisting of tungsten or tungsten alloy for dispensing positive ions without corroding.

As will appear, the needles may consist entirely of tungsten or tungsten alloy with a precious metal, or such composition may be formed as a layer (as by plating, cladding, or other application) on a metal needle (stainless steel, copper, etc.); and the so formed needles may be employed in a dual cable system one cable having positive voltage applied thereto and to said needles, or a single cable carrying such needles may be employed.

As will appear, the cables are typically flexible so as to bend and fit in different work areas; the spacers may typically have grooves in which the first and second cables are retained in such close alignment that tips on the two flexible cables project in generally the same direction, i.e. toward the work area, up or down; and auxiliary cable means may be provided, with controlled voltage application thereto, to enhance ion travel toward the work area to neutralize static. The cables may include cores consisting of wire strands penetrated by the needles.

As will appear, pairs of cables, each with ion dispensing tips, may be located at adjusted distances from the work, the cables of each pair having adjusted separation and being respectively adapted to receive positive and negative voltage application, the levels of which may be controlled, all for the purpose of achieving static charge neutralization or reduction at or adjacent the work. In addition, the spacing of the tips or needles on the cables is adjusted to achieve that objective.

Typically, groups of tips on the first cable of a pair are staggered relative to groups of needles on the second cable of that pair; and the tips are located in association with the spacers to achieve desired balance of positive and negative ions in the work zone toward which the tips project, or some excess of positive ions.

The invention enables static charge control in work zones, elimination of dangerous arcing in such zones, and control of net ion flux in animal or poultry zones and in edibles smoke houses, and clean rooms to provide unusual advantages, as will appear, and extended needle life.

These and other objects and advantages of the invention, as well as the details of an illustrative embodiment, will be more fully understood from the following specification and drawings, in which: DRAWING DESCRIPTION FIG. 1 is a plan view of apparatus embodying the invention;

FIG. 2 is a section on lines 2—2 of FIG. 1;

FIG. 3 shows cable support; and FIG. 4 shows cables in an article treatment zone;

FIG. 4 shows cables in an article treatment zone;

FIG. 5 is a perspective view showing a multiple cable and wire system;

FIG. 6 is an elevation showing the FIG. 5 system installed in a clean room;

FIG. 7 is a fragmentary elevation showing the FIG. 5 system installed above a perforated, false ceiling;

FIG. 8 is like FIG. 7;

FIG. 9 is a plan view of cables retained by improved spacer;

FIG. 10 is an enlarged plan view of a spacer as shown in FIG. 9;

FIG. 11 is a section on lines 11—11 of FIG. 10;

FIG. 12 is a perspective view like FIG. 5, showing the FIGS. 9–11 spacers, and voltage adjustment of the cables as well as of an auxiliary wire; and FIG. 13 is a sectional view of a modified cable and needle, and FIG. 14 shows a modified needle.

DETAILED DESCRIPTION

Referring to FIGS. 1 and 2, first and second cable means appear at 204 and 206. Each cable includes an elongated conductive metal core 207, and a protective sleeve 208 of insulative, such as polypopulene or polyethylene, material Ion dispensing tips, as formed for example by needles, are shown at 209 and 210. The tips project generally in the same direction, as toward work areas 211 seen in FIG. 4, there being work elements 212 such area, to be made static free.

The cables are typically flexible so they can be strung in straight or curved lines or configuration. Note straight cable lengths 204a and 204c, and curved lengths or bends 204b in FIG. 4. Also the cable pair 204 and 206 has adjusted lateral separation characterized in that static electrically at or proximate the work is effectively reduced to non-objectionable level or levels when positive and negative voltages are applied to the respective cables. Note positive voltage source 212 connected at 213 to cable 204, and negative voltage source 214 connected at 215 to cable 206.

Spacers are provided as at 217 and located at selected positions along the cables to hold them at adjusted separation K. The latter is typically between ½ and 1½ inches.

Such spacers are shown in the form of insulative plastic bars, having two notches 219 at K separation to removably receive the cables, sidewardly, i.e. with snap-in reception. The notches are sized to receive and firmly retain the cables, as shown in FIG. 19. The cables are frictionally held against rotation and the needles or tips 209 and 210 are held projecting in the same direction, despite the bending of the parallel cables to conform to room geometry, as at 204b.

Holders are provided to support the cable pairs at selected spacing from enclosure structure. In the example, insulative plastic rods 220 are suitable attached at 221 to the ceiling or wall of enclosure 222, and support the cables. FIG. 3 shows the rod 220 having a side notch at 223, to receive a cable 204 or 206 of a connected pair.

The dual cables 204 and 206 as described, may be employed for purposes as described above.

Adjustment of the positive and negative ion dispensation by the tip groups 209 and 210 is also enabled to aid in achivement of substantial neutralization of static in work area. In this regard, note in FIG. 1 that the tips 209 in cable 206 are sidewardly offset from a portion 204d of the cable 204 which contains no tips; and that tips 210 in cable 204 are sidewardly offset from a portion 206d of the cable 206 which contains no tips. Also, spacers 217 divide such staggered groups 209 and 210, as shown. Further, the tips or needles in each group can be selectively removed to reduce ion dispensation, to aid in achieving static neutralization. Thus, if there is an excess of + charge at a particular location in the work area, one or more needles 210 or tips carrying + charge and located closest to that area may be removed from cable 204, thereby to aid in achievement of charge balance in the work area. Alternatively needles 209 may be added to cable 206. The needles may be pulled from the cable, and re-inserted at will. Note in FIG. 2 that the needles extend adjacent the sides of the cores 207, and held in that position by the plastic sleeve.

Also in FIG. 1, perpendiculars 226 from cable 204 intersect tips 209, such perpendiculars spaced from tips 210, and perpendiculars 227 from cable 206 intersect tips 210, such perpendiculars spaced from tips 209.

Tip protection means may also be provided (as shown in FIGS. 4a-4d, referred to above) on the cables 204 and 206.

From the above FIGS. 1-4 it will be seen that the method of substantially neutralizing static electricity at work in an extended work zone (the work occupying only a local relatively small portion of that zone) involves the steps:
 (a) dispersing into the bulk of the extended work zone including said portion thereof both positive and negative ions,
 (b) such dispersing carried out to substantially balance the positive and negative ion content in that portion of the zone.

Also, both positive and negative ions are dispersed from a large number of intermixed multiple points spaced about the extended zone.

Referring now to FIGS. 5 and 6, elements which remain the same as in FIGS. 1-4 are given the same numbers.

The system includes not only the first and second cable means or cables 204 and 206, as before, but also auxiliary means spaced from the cable means in the general direction of ion flow or travel toward the work, such auxiliary means being at or near ground potential, and having exposed electrically conductive surface extent. In the example, the auxiliary means comprises a bare wire 230, aluminum or copper for example, which extends generally parallel to and below the cables 204 and 206. It may be supported, for example, by the insulative plastic rods 220, as in a side notch 231 in each rod. The wire 230, grounded as at 232, is centered generally below the high voltage, positive and negative cables 204 and 206, at a distance of between 3 and 12 inches therefrom, the optimum distance being between 4 and 6 inches. It is found that the grounded wire enhances static neutralization effect all the way to the floor 233, including the area of the work 212 at distances of 7-9 feet below the cables 204 and 206. Also, the second cable 230 tends to balance the positive and negative field ionization, thereby improving the static neutralization—even to zero in many cases. In this regard, pairs of cables 204 and 206, and wires 230, are typically separated by distance "d", which is 3-5 feet.

In FIG. 7, a false, electrically insulative, ceiling panel 240 extends parallel to and below the structural ceiling 241, leaving a ceiling space 242 therebetween. Panel 240 is perforated at a large number of row and column locations, as at 252, to pass air as from space 242 into a work zone 211. The perforations may taper downwardly, and have upper entrance diameters of about ⅜ inch and lower exit diameters of about 5/16 inch. Cables 204 and 206 are suspended in space 242, as by plastic rods 220a, or other supports, to emit positive and negative ions via tips as referred to above. The ions then pass downwardly into zone 211 via perforations 252. Ground wire 230 is suspended by panel 242 and plastic support rods 220b below cables 204 and 206. The ground wire helps draw or attract the ions through the perforations 252. FIG. 8 shows a panel 240a, like panel 240, below cables 204 and 206 and also below ground wire 230. Floor 233 may be perforate as at 247 to pass air and dust from space 211 to a filter 248 and return to space 242.

In FIGS. 9-12, the cables 304 and 306 correspond to cables 204 and 206, respectively in FIG. 5, and the auxiliary wire 330 corresponds to wire 230 in FIG. 5. Rods 320 support the cables and wire as in FIG. 5. Wire 330 is supplied with voltage as from source 350, which is adjustable, and cables 304 and 306 are supplied with voltage from sources 312 and 314, which are adjustable.

Typically, voltage from source 312 is more positive than voltage from source 314, and is therefore shown as +, whereas source 314 is shown as —. See adjustment knobs 312a, 314a and 350a. Voltage from source 350 may be neutral, (i.e. grounded), positive or negative. The function of wire 330 is to enhance static neutralization effect in the work area therebelow, as described in FIG. 5.

The improved spacers 370 have elongated parallel grooves 340 and 341 in which the cable 304 and 306 are retained at locations and separation from one another characterized in that static electricity at or proximate the work to be treated is effectively reduced to nonobjectionable levels when the differential voltages are applied to the cables 304 and 306. See in this regard the tips defined by needles 309 on cables 304 and needles 310 on cable 306. The needles are associated with the spacers, wherein the cables are gripped, so that the tips point in directionally controlled relation. The spacers are located along the cables at spacing L which varies between 3-4 inches and 2 feet. Needles 309 are associated with spacers which alternate with spacers associated with needles 310; and typically there are more needles 310 per unit length of cable than there are needles 309. An example is shown in FIG. 9, wherein spacers 307a carry one positive needle each, on cable 304, whereas alternate spacers 307b carry two needles, each, on cable 306. Needles 310 normally are negatively charged.

FIGS. 9-12 also show the provision of the spacers or cable spreaders in the form of molded plastic blocks 370 defining the parallel grooves 340 and 341. Pressure is exerted on the sides of the cables in the blocks, to hold the cables in place. The grooves have sideward entrance channels 340a and 341a, and enlarged interiors 340b and 341b communicating with the channels, for reception of the cables, with pressurization. The depths of the grooves are sufficient that the tips of the needles 310 are within channels 340a and 341a, to protect against snagging or injury to other apparatus or persons, especially when the cables are wound as during storage or shipment.

In FIG. 13 the cable 404 comprises multiple electrical wire strands 405 enclosed within insulative sheath 406. An electrically conductive needle 407 has been pressed into and through the bundle of strands 405 (the core) to spread apart at least some strands and to protrude at tip 407a. This construction enables rapid assembly of needles to the cable, and very good electrical contact of the needles to the core. Also the needle point is preserved, and not blunted by solid core metal.

In FIG. 14, the modified needle 500 consists of a conductive metal core 501 (copper for example) on which a tungsten or tungsten alloy layer 502 has been applied, as by coating, cladding, plating, etc. That layer defines the sharp tip or point 502a from which positive ions are emitted. A positive voltage source 504 is connected with the needle 500, and it is found that no corrosion of the needle or its tip occurs, whereas, with non tungsten needles corrosion can and does occur. The layer 502 may alternatively consist of a metallic tungsten alloy, as for example gold and tungsten, or platinum and tungsten, the weight % of tungsten being in excess of about 50%. The cable core and sheath elements 405 and 406 are the same as in FIG. 13, the needle having been forced through the core to have good sideward electrical contact with the core. All the needles described above in FIGS. 1-13, and to which positive voltage is applied, typically have the tungsten or tungsten alloy construction of FIG. 14, or else a solid tungsten or tungsten alloy composition, throughout the needle. Typical positive voltages are between 5000 and 15,000 volts, DC. Single conductors employing such needles are also contemplated (i.e. omitting the companion negative needle cable).

I claim:

1. In apparatus for reducing static electricity in a work zone, the combination that includes
   (a) electrically conductive cable means having tips spaced therealong to dispense ions in response to voltage application to the cable means,
   (b) the cable means defining cable extents each of which is flexible and includes elongated metallic core extent to which voltage is applicable, protective sleeve extent on and extending about the core extent, the sleeve defining a wall,
   (c) and needles having shanks extending through said wall extents and extending adjacent the core extents to make sideward electrical contact therewith so as to receive voltage application, the needles defining the tips openly exposed outwardly of the cable extents to dispense ions into the atmosphere near the cable means,
   (d) at least certain of the needles having surfaces at said tips consisting of tungsten or tungsten alloy for dispensing positive ions without corroding.

2. The combination of claim 1 wherein said certain needles consist of tungsten.

3. The combination of claim 1 wherein said certain needles are metallic and have a tungsten layer thereon.

4. The combination of claim 1 including a positive voltage source electrically connected with said cable extents to provide positive voltage to said certain needles.

5. The combination of claim 1 wherein said needle shanks are pushed through the core extents to have opposite sides in forcible engagement with said core extents.

6. In apparatus for reducing static electricity in a work zone, the combination that includes
   (a) first electrically conductive cable means having tips spaced therealong to dispense positive ions in response to positive voltage application to the first cable means,
   (b) second electrically conductive cable means having tips spaced therealong to dispense negative ions in response to negative voltage application to the second cable means, and
   (c) said cable means located at adjusted separations from one another characterized in that static electricity at or proximate the work is effectively reduced to non-objectionable levels when said positive and negative voltages are carried to the cable means,
   (d) there being spacers located along the lengths of the cable means and holding the cable means at said adjusted separations,
   (e) said cable means defining cables each of which is flexible and includes an elongated metallic core to which voltage is applicable, the cable including a protective sleeve of insulating material on and extending along and about the core, the sleeve defining a wall,
   (f) and needles having shanks penetrating through said sleeve wall and extending sidewardly adjacent the core to make electrical contact therewith so as to receive application of said voltage, the needles defining said tips openly exposed outwardly of the cable to dispense ions into the atmosphere near the cable.

(g) said tips associated with the first cable means consisting of tungsten or tungsten alloy.

7. The combination of claim 5 wherein said needles are metallic and consist of tungsten.

8. The combination of claim 5 wherein said needles are metallic and have a tungsten layer thereon.

9. The combination of claim 6 including positive and negative voltage sources electrically connected with said respective cable means.

10. The combination of claim 6 wherein said needle shanks are pushed through the core extents to have opposite sides in forcible engagement with said core extents.

11. In apparatus for reducing static electricity in a work zone, the combination that includes:

(a) first electrically conductive cable means having tips spaced therealong to dispense positive ions in response to first voltage application to the first cable means, (b) second electrically conductive cable means having tips spaced therealong to dispense negative ions in response to second voltage application to the second cable means, said first and second voltages being different, and (c) spacers holding said cable means at locations and separations from one another characterized in that static electricity at or proximate the work to be treated is effectively reduced to non-objectionable levels when said differential voltages are applied to the cable means, (d) and the spacers spaced apart along the lengths of the cables and said tips located in association with the spacers, (e) the tips associated with the first cable means consisting of tungsten or tungsten alloy.

12. The combination of claim 11 wherein said tips are in portions of the cable means confined by the spacers.

13. The combination of one of claim 11 wherein the first cable means is adapted to have positive voltage applied thereto, and the second cable means is adapted to have negative voltage applied thereto, there being a larger number of said tips carried by the first cable means than by the second means, per unit length of the cable means.

14. The combination of claim 12 wherein the first cable means is adapted to have positive voltage applied thereto, and the second voltage is adapted to have negative voltage applied thereto, there being about twice as many tips carried by the second cable means, per unit length of the cable means.

15. The combination of claim 11 wherein said spacers comprise molded plastic blocks having two cable receiving grooves therein, the cables being retained snugly in the grooves with the tips pointing toward groove exterior.

16. The combination of claim 15 wherein the grooves have sideward cable entrance channels, and enlarged interiors communicating with said channels, for reception of the cables.

17. The combination of claim 1 including differential voltage sources operatively connected with said cable means.

18. The combination of claim 12 wherein only one of the two cable means confined by each spacer has said tip or tips thereon.

19. The combination of one of claims 11 and 18 wherein the tips project in generally to same direction, the first and second cable means being flexible.

20. The combination of claim 11 including said work in said zone.

* * * * *